US012038122B2

(12) United States Patent
Schulter et al.

(10) Patent No.: US 12,038,122 B2
(45) Date of Patent: Jul. 16, 2024

(54) REINFORCED LOAD QUICK RELEASE MOUNTING SYSTEM

(71) Applicant: Michael Schulter, Houston, TX (US)

(72) Inventors: Michael Schulter, Houston, TX (US); Nathan Zwetzig, Westminster, CO (US)

(73) Assignee: CMS TECHNICAL HOLDINGS, LLC, Houston, TX (US)

( * ) Notice: Subject to any disclaimer, the term of this patent is extended or adjusted under 35 U.S.C. 154(b) by 0 days.

(21) Appl. No.: 17/875,027

(22) Filed: Jul. 27, 2022

(65) Prior Publication Data
US 2024/0035610 A1 Feb. 1, 2024

(51) Int. Cl.
F16M 11/04 (2006.01)
F16M 13/02 (2006.01)

(52) U.S. Cl.
CPC ........ F16M 11/041 (2013.01); F16M 13/022 (2013.01); F16M 2200/028 (2013.01)

(58) Field of Classification Search
CPC ............... F16M 11/041; F16M 13/022; F16M 2200/028
See application file for complete search history.

(56) References Cited

U.S. PATENT DOCUMENTS

| | | | | |
|---|---|---|---|---|
| 6,254,302 B1 * | 7/2001 | Kraus | ................... | F16B 5/0628 403/328 |
| 6,758,454 B2 * | 7/2004 | Smed | ................. | F16M 11/2092 248/314 |
| 6,935,883 B2 * | 8/2005 | Oddsen, Jr. | .......... | H01R 13/625 439/534 |
| 7,317,613 B2 * | 1/2008 | Quijano | ............. | F16M 11/2021 439/534 |
| 7,594,823 B2 * | 9/2009 | Moscovitch | ........... | F16M 13/02 248/917 |
| 8,020,821 B2 * | 9/2011 | Chen | ...................... | F16M 13/02 248/221.11 |
| 9,010,537 B2 | 4/2015 | Carnevali | | |
| 9,674,975 B2 | 6/2017 | Carnevali | | |
| 9,844,238 B2 * | 12/2017 | Lemoine | .................. | A42B 3/08 |
| 10,371,310 B1 * | 8/2019 | Schulter | ............. | F16M 11/2078 |
| 10,656,502 B1 * | 5/2020 | Sandoval | ................ | H04N 23/54 |
| 2012/0033361 A1 * | 2/2012 | Tsai | ....................... | F16M 11/22 361/679.01 |

(Continued)

Primary Examiner — Monica E Millner
(74) Attorney, Agent, or Firm — Jackson Walker LLP

(57) ABSTRACT

A reinforced load mounting system that is releasably coupled and decoupled from a portable device with a supporting system having a channel to slidably engage a mounting system. The channel further an overarching wing on both sides of the channel under which an inner mounting plate of the mounting assembly can be constrained in the channel in at least an outward second direction. The mounting assembly further includes an outer mounting plate that overlaps the overarching wings on both sides of the channel. The wings are thus slidably engaged with the mounting assembly but restrained in a wing opening between the inner and outer mounting plates. A large force that would otherwise bend the wing outwardly is countered by a resulting force from the overarching outer mounting plate of the mounting assembly to keep the portable device coupled with the mounting system.

8 Claims, 8 Drawing Sheets

(56) References Cited

U.S. PATENT DOCUMENTS

| | | | |
|---|---|---|---|
| 2012/0099849 A1* | 4/2012 | Onishi | B60R 11/04 |
| | | | 396/419 |
| 2012/0286118 A1* | 11/2012 | Richards | H04M 1/04 |
| | | | 248/299.1 |
| 2013/0083507 A1* | 4/2013 | Guirlinger | B60R 11/02 |
| | | | 296/70 |
| 2013/0094127 A1* | 4/2013 | Lu | F16M 11/06 |
| | | | 361/679.01 |
| 2016/0363262 A1* | 12/2016 | Moelmann | F16M 11/041 |

* cited by examiner

REINFORCED LOAD QUICK RELEASE MOUNTING SYSTEM

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure relates generally to mounting systems. More specifically, the disclosure relates to a mounting system that can be releasably coupled with a support system for a portable device, so that the support system can withstand a substantial force while remaining engaged with the mounting system.

Description of the Related Art

Detachable systems for electronic and other portable devices frequently allow users to support the portable devices in a fixed location. These detachable systems often are docking stations that include communication means and powering means for use with electronic portable devices and can be simply pulled by hand pressure from the docking station when needed. Other support systems have no communication means or powering means, but are held to a supporting surface by suction, adhesives, or mechanical attachment. In some systems, the support is typically a "permanent" affixation and can provide stability for the device. In other systems, the support is temporary and often lacking in rigidity, especially in harsh or unstable environments. In some temporary support systems, release structures are activated to release the portable device, but can be difficult to align and reengage upon return.

Improvements for releasable temporary support systems have been recently made as shown and described in U.S. Pat. No. 10,371,310. The design and ease of use of such a support system has become popular, particularly in the airline industry. Flight crews can readily attach their flight devices with a support system to a mounting assembly for temporary use and then readily detach the support system from the mounting assembly upon completion to repeat the use for a next flight.

FIG. 1 is a schematic front view of a known portable device with a support system. FIG. 2 is a schematic back view of the support system of FIG. 1. A portable device 2 can include a support system 4. The support system 4 can be removably coupled to the portable device, or can be integrally coupled to the portable device. The support system can include a channel 6 having a bottom 7 and a first side 25 and a second side 26 with an opening 8 between the sides. The channel 6 can further have overarching wings 10 that extend at least partially across the channel opening 8 creating slots from each side 25 and 26 and over the bottom 7 of the channel.

FIG. 3 is a schematic back view of the support system of FIG. 2 with a mounting assembly in proximity for attaching with the support system. FIG. 4 is a schematic back view of the support system of FIG. 3 with the mounting assembly attached with the support system. FIG. 5 is a schematic orthogonal axis diagram relative to the portable device of FIG. 1. FIG. 6A is a schematic cross section view of the portable device with the support system unattached with the mounting assembly of FIG. 4. FIG. 6B is a schematic cross sectional view of the portable device with the support system attached with the mounting assembly. A mounting assembly 20 is configured to slidably engage the support system 4 in the channel 6. The mounting assembly 20 includes a mounting plate 21 that is sized to go in the channel 6 between sides 25 and 26 and under inner wing surfaces 12 of overarching wings 10 on each side. A retainer 14 is configured to engage the mounting assembly 20. When engaged with the support system 6, the mounting assembly 20 is restricted from movement in a first sideways direction 17 by the sides 25 and 26, in a second outward direction 18 by the wings overarching wings 10, and a third longitudinal direction 19 by engaging the retainer 14.

FIG. 7 is a schematic cross sectional view of a force being applied to the portable device with the support system of FIG. 4 that compromises the attachment to the mounting assembly. FIG. 8 is a schematic cross sectional view of another force from a different position being applied to the portable device with the support system of FIG. 4 that compromises the attachment to the mounting assembly. When a sufficient force 22 is applied to a back of the support system 4, at least one of the wings 10 can be bend in a direction B by the resulting force of the mounting plate 21 on the inner wing surface 12. The force 22 can further bend the wing and cause the mounting assembly 20 to become detached from the channel 6. Likewise, a sufficient force 22' applied to a front of the portable device 2 coupled with the support system 4 can cause a similar result.

There remains a need for an improved mounting system to interface with a support system and be releasably coupled thereto.

BRIEF SUMMARY OF THE INVENTION

The disclosure provides a reinforced load mounting system that can be releasably coupled and decoupled from a portable device. The portable device can include a supporting system, integral with the device or attachable to the device, to interface with the mounting system. The supporting system can include a channel for the mounting assembly to slide along the channel and be aligned with a retainer to securely couple the device with the mounting assembly. As the mounting assembly slides along the channel, a portion of the channel is sized to constrain the mounting assembly in a sideways first direction. The channel further includes an overarching wing over the channel on both sides of the channel under which an inner mounting plate of the mounting assembly can be constrained to the channel in at least an outward second direction. Upon engagement with the retainer, the mounting assembly is constrained in a longitudinal third direction, so that the mounting assembly is constrained in all three orthogonal directions in the X-Y-Z axes. The mounting assembly further includes an outer mounting plate coupled with the inner mounting plate with a gap therebetween to form an opening for the wing on each side of the channel. The outer mounting plate overlaps the overarching wings on the sides of the channel. The wings are thus slidably engaged with the mounting assembly but restrained from bending outwardly in the wing openings. A large force that would otherwise bend at least one of the wings outwardly is countered by a resulting force from the overarching outer mounting plate of the mounting assembly. Because the wing is substantially restrained from bending, then the overarching wings can continue restraining the inner mounting plate of the mounting assembly, and the portable device can stay coupled with the mounting assembly even with the large force.

The disclosure provides a reinforced load mounting system for a portable device having a detachable support system with a channel, the channel having a bottom and a first side and a second side with a channel opening between the sides, and further having overarching wings that extend at least partially across the channel opening from each side and over the bottom of the channel, the mounting assembly comprising: an inner mounting plate configured to slidably engage the support system in the channel between a bottom of the channel and the wings to detachably couple the support system and the mounting assembly, the wings being configured to restrain the inner mounting plate from detachment from the support system in an outward direction; and an outer mounting plate coupled to the inner mounting plate and having a width that is wider than a dimension between the wings across the channel and configured to restrain the wings from bending movement in an outward direction by being coupled with the inner mounting plate to cause the wings to restrain detachment of the inner mounting plate from at least one of the wings.

The disclosure also provides a method of restraining a detachable support system coupled with a mounting assembly forming a reinforced load mounting system, the support system having a channel, the channel having a bottom and a first side and a second side with a channel opening between the sides, and further having overarching wings that extend at least partially across the channel opening from each side and over the bottom of the channel, the mounting assembly comprising: sliding the support system channel along the mounting assembly; enclosing an inner surface and an outer surface of the wings of the channel in a wing opening of the mounting assembly between an inner mounting plate and an outer mounting plate of the mounting assembly to couple the support system with the mounting assembly; and resisting a force applied to the support assembly from causing the support assembly to become disengaged with the mounting assembly comprising resisting bending of the wings in the wing opening between the inner mounting plate and outer mounting plate.

DETAILED DESCRIPTION

Figure 1:
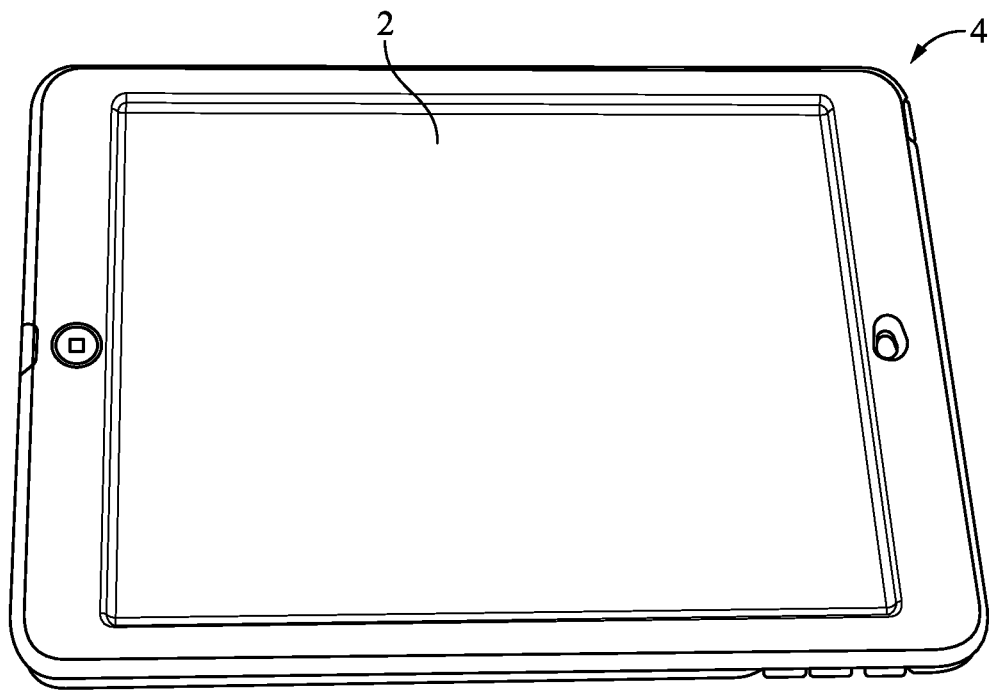
FIG. 1 is a schematic front view of a known portable device with a support system.
Figure 2:
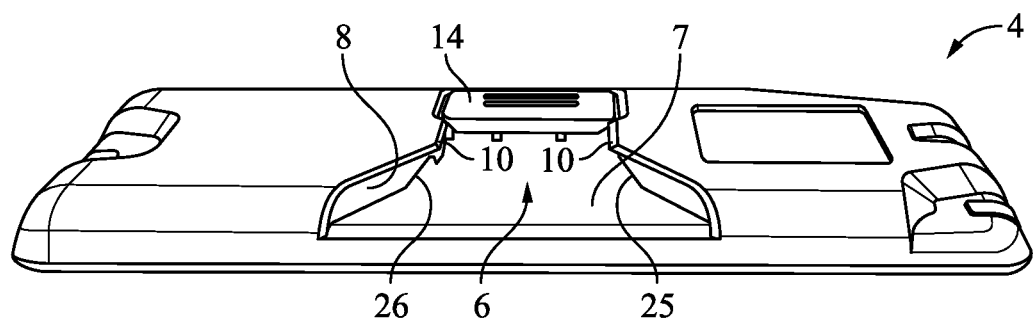
FIG. 2 is a schematic back view of the support system of FIG. 1.
Figure 3:
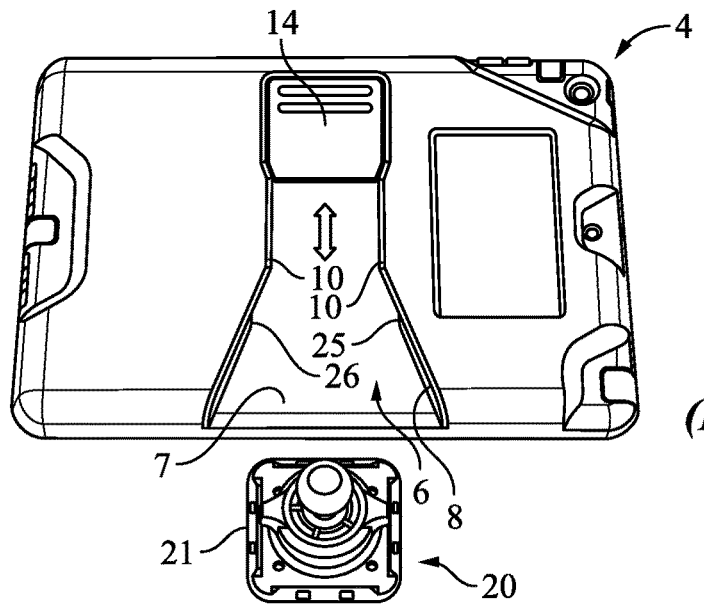
FIG. 3 is a schematic back view of the support system of FIG. 2 with a mounting assembly in proximity for attaching with the support system.
Figure 4:
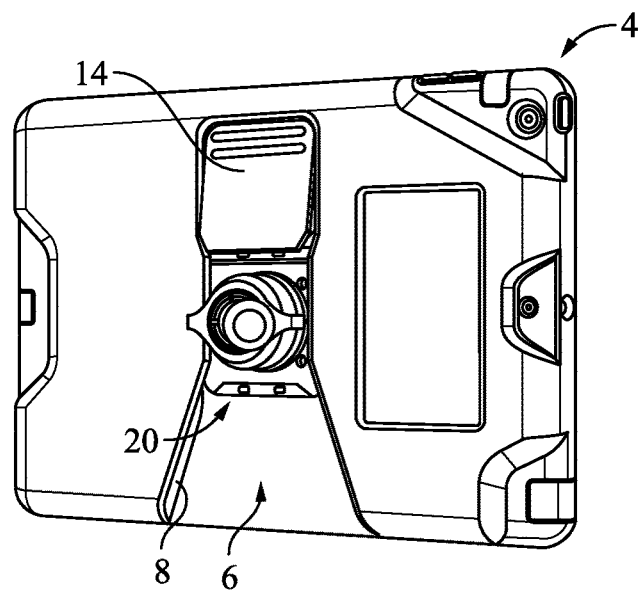
FIG. 4 is a schematic back view of the support system of FIG. 3 with the mounting assembly attached with the support system.

The Figures described above and the written description of specific structures and functions below are not presented to limit the scope of what Applicant has invented or the scope of the appended claims. Rather, the Figures and written description are provided to teach any person skilled in the art how to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location, or with time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The terms "top", "up", "uphole", "bottom", "down", "downhole", and like directional terms are used to indicate the direction relative to the figures and their illustrated orientation and are not absolute relative to a fixed datum such as the earth in commercial use. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unitary fashion. The coupling may occur in any direction, including rotationally. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions. Some elements are nominated by a device name for simplicity and would be understood to include a system of related components that are known to those with ordinary skill in the art and may not be specifically described. Various examples are provided in the description and figures that perform various functions and are non-limiting in shape, size, description, but serve as illustrative structures that can be varied as would be known to one with ordinary skill in the art given the teachings contained herein. As such, the use of the term "exemplary" is the adjective form of the noun "example" and likewise refers to an illustrative structure, and not necessarily a preferred embodiment. Element numbers with suffix letters, such as "A", "B", and so forth, or numbers with prime, double prime, and so forth, such as 1, 1', 1", and so forth, are to designate different elements within a group of like elements having a similar structure or function, and corresponding element numbers without the letters are to generally refer to one or more of the like elements. Any element numbers in the claims that correspond to elements disclosed in the application are illustrative and not exclusive, as several embodiments are disclosed that use various element numbers for like elements.

A reinforced load mounting system that is releasably coupled and decoupled from a portable device with a supporting system having a channel to slidably engage a mounting system. The channel further an overarching wing on both sides of the channel under which an inner mounting plate of the mounting assembly can be constrained in the channel in at least an outward second direction. The mounting assembly further includes an outer mounting plate that overlaps the overarching wings on both sides of the channel. The wings are thus slidably engaged with the mounting assembly but restrained in a wing opening between the inner and outer mounting plates. A large force that would otherwise bend the wing outwardly is countered by a resulting force from the overarching outer mounting plate of the mounting assembly to keep the portable device coupled with the mounting system.

Figure 9:
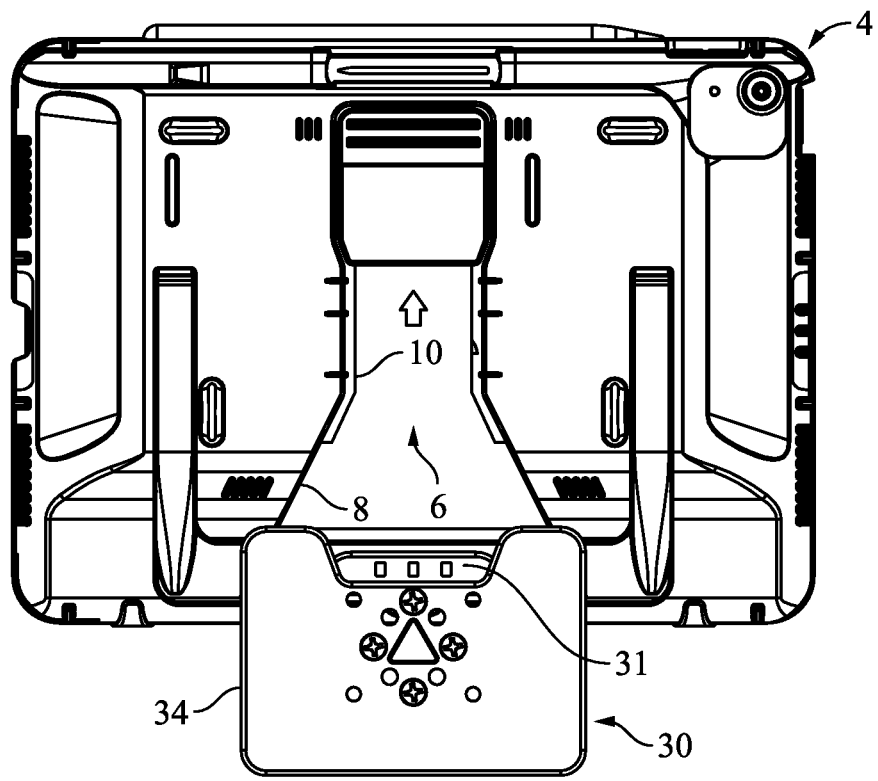
FIG. 9 is a schematic back view of the support system of FIG. 1 being coupled with an exemplary embodiment of the reinforced load mounting assembly of the present invention.
Figure 10:
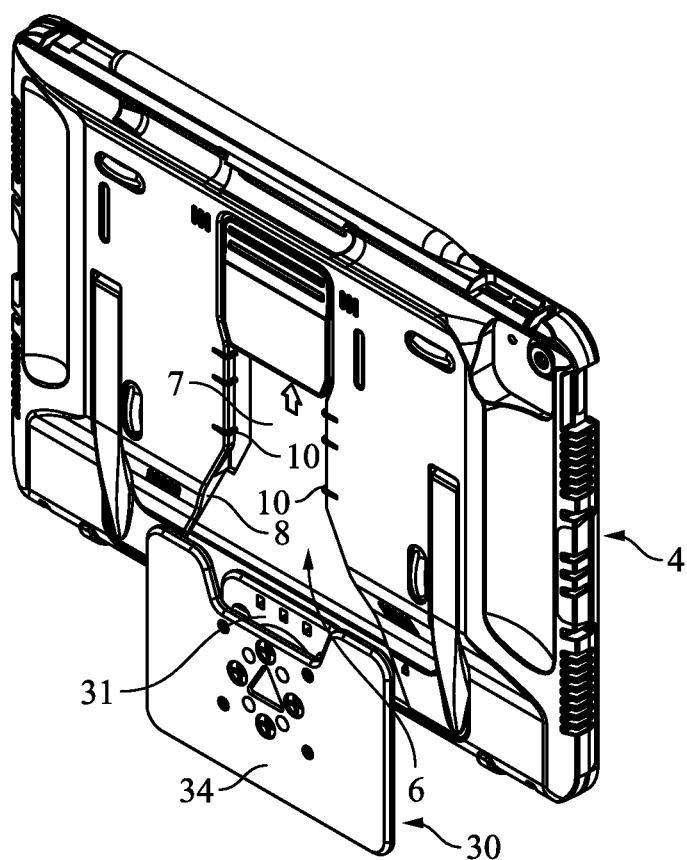
FIG. 10 is a schematic back perspective view of the support system of FIG. 1 being coupled with the reinforced load mounting assembly of FIG. 9.

FIG. 9 is a schematic back view of the support system of FIG. 1 being coupled with an exemplary embodiment of the reinforced load mounting assembly of the present invention. FIG. 10 is a schematic back perspective view of the support system of FIG. 1 being coupled with the reinforced load mounting assembly of FIG. 9. The disclosure provides a reinforced load mounting assembly as an improvement. The mounting assembly 30 includes an inner mounting plate 31 and an outer mounting plate 34. The inner mounting plate 31 is sized to engage the channel 6 under the overarching wings 10. The outer mounting plate 34, fixedly coupled to the inner mounting plate, is sized to overlap the wings 10 across the channel 6.

Figure 5:
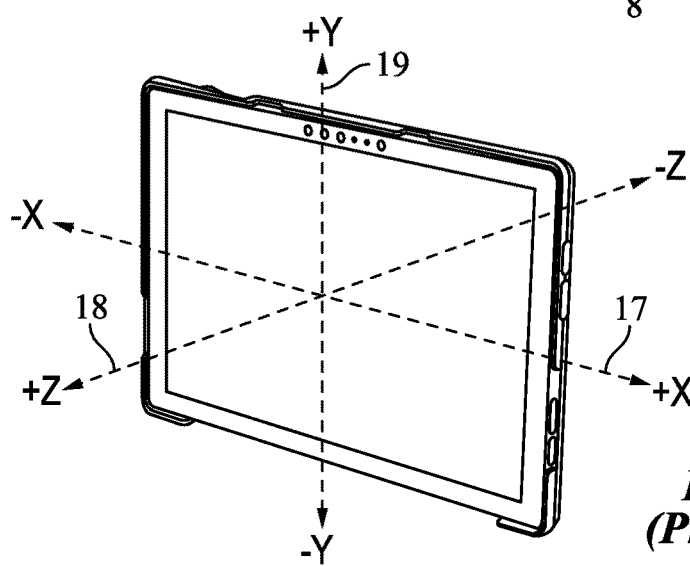
FIG. 5 is a schematic orthogonal axis diagram relative to the portable device of FIG. 1.
Figure 6A:
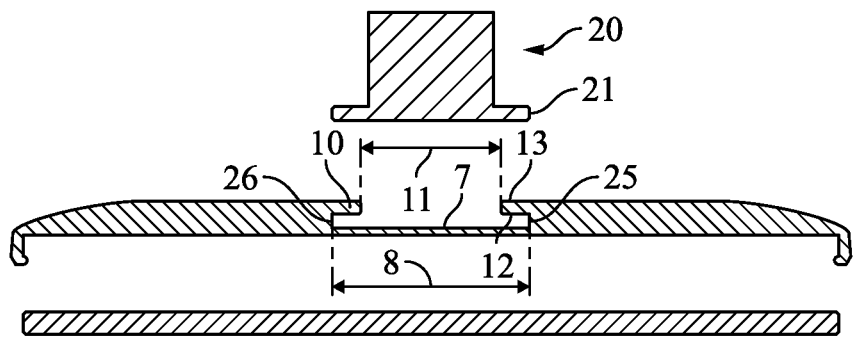
FIG. 6A is a schematic cross section view of the portable device with the support system unattached with the mounting assembly of FIG. 4.
Figure 6B:
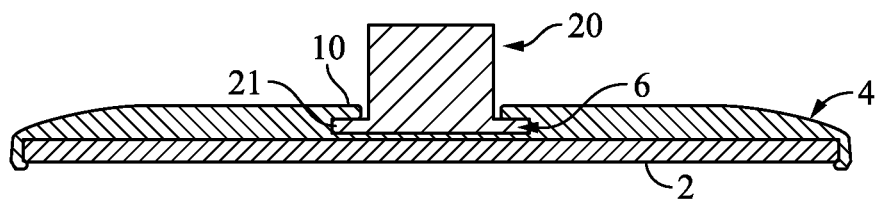
FIG. 6B is a schematic cross sectional view of the portable device with the support system attached with the mounting assembly.
Figure 7:
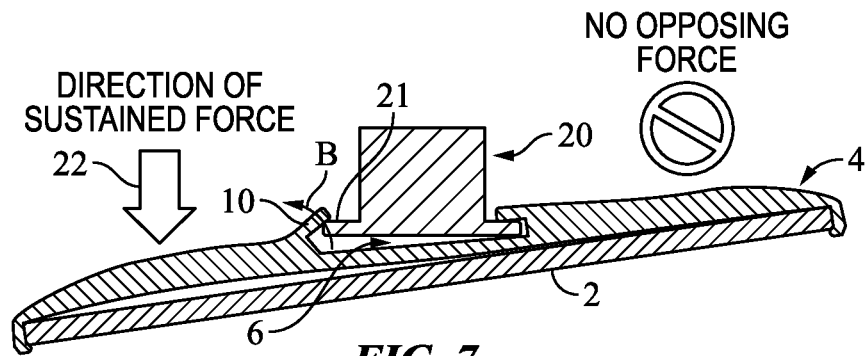
FIG. 7 is a schematic cross sectional view of a force being applied to the portable device with the support system of FIG. 4 that compromises the attachment to the mounting assembly.
Figure 8:
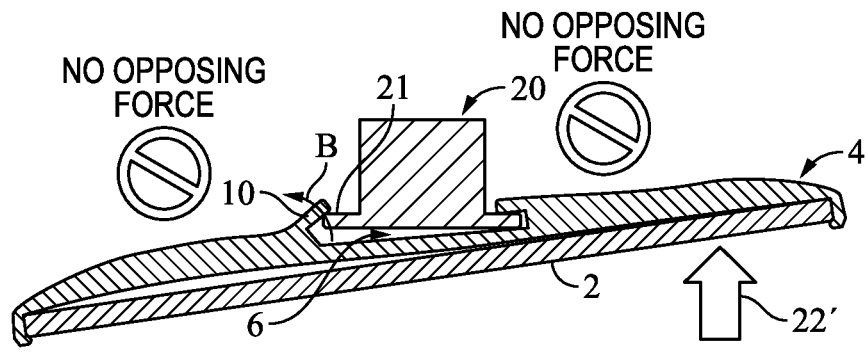
FIG. 8 is a schematic cross sectional view of another force from a different position being applied to the portable device with the support system of FIG. 4 that compromises the attachment to the mounting assembly.
Figure 11:
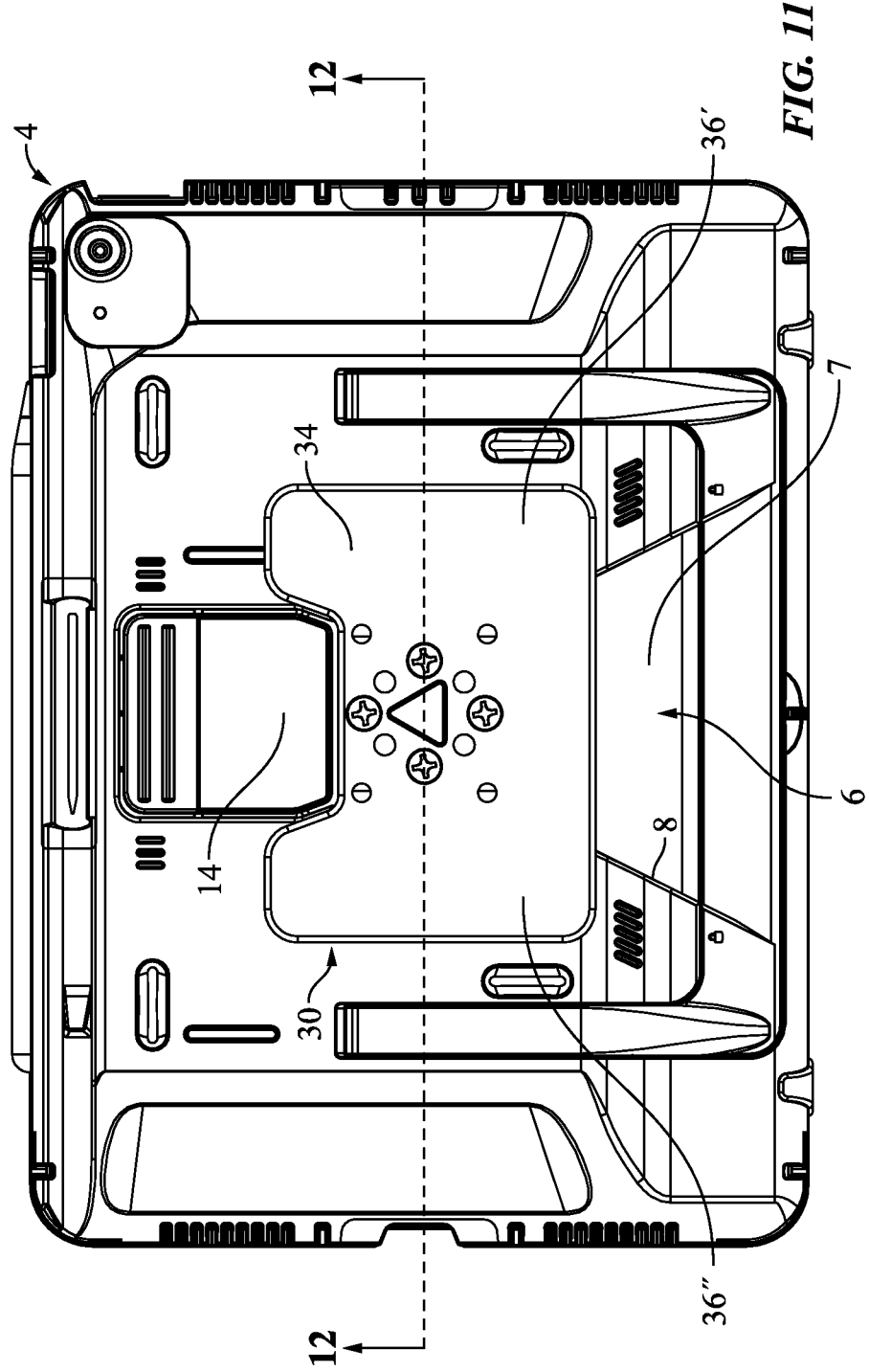
FIG. 11 is a schematic back view of the support system of FIG. 1 coupled with the reinforced load mounting assembly of FIG. 9.
Figure 12:
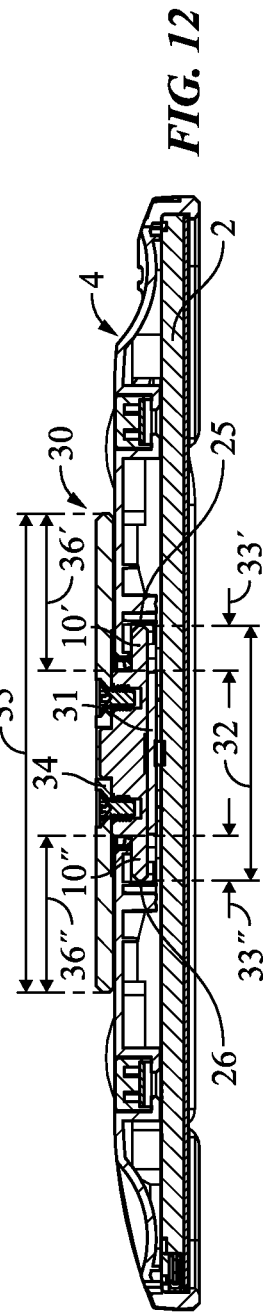
FIG. 12 is a schematic cross sectional view of the portable device with the support system attached with the reinforced load mounting assembly of FIG. 11.
Figure 13:
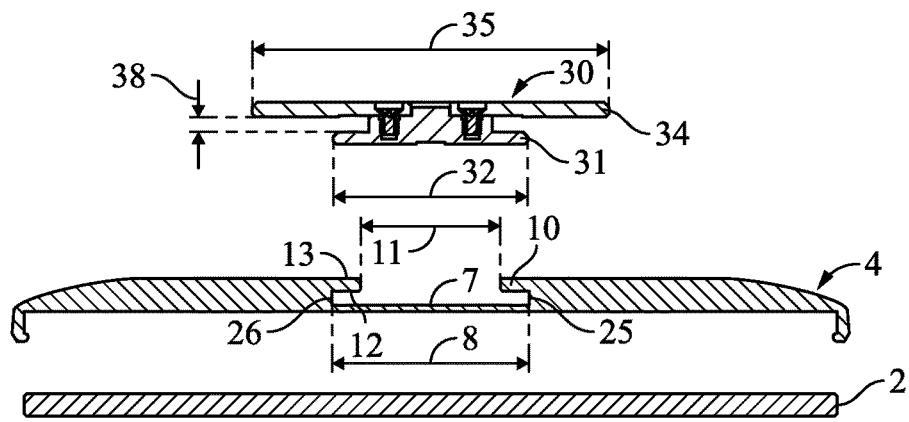
FIG. 13 is a schematic cross sectional diagram of the portable device with the support system and the reinforced load mounting system of FIG. 11 separated for illustrative purposes.
Figure 14:
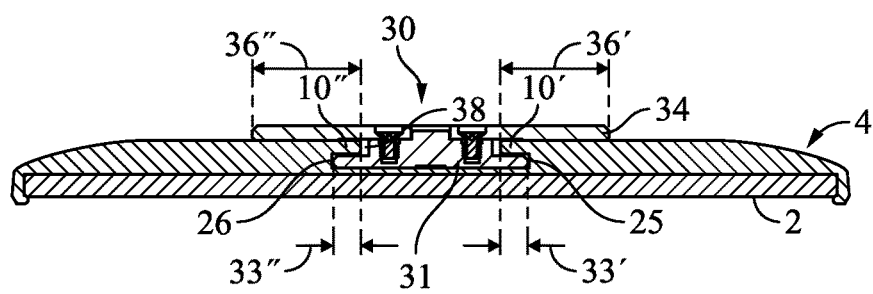
FIG. 14 is a schematic cross sectional diagram of the portable device with the support system coupled with the reinforced load mounting system of FIG. 13.

FIG. 11 is a schematic back view of the support system of FIG. 1 coupled with the reinforced load mounting assembly of FIG. 9. FIG. 12 is a schematic cross sectional view of the portable device with the support system attached with the reinforced load mounting assembly of FIG. 11. FIG. 13 is a schematic cross sectional diagram of the portable device with the support system and the reinforced load mounting system of FIG. 11 separated for illustrative purposes. FIG. 14 is a schematic cross sectional diagram of the portable device with the support system coupled with the reinforced load mounting system of FIG. 13. The reinforced load mounting assembly 30, having an inner mounting plate 31, can slide along the bottom 7 of the channel 6 in the opening 8 between sides 25 and 26 of the channel and under the overarching wings 10. The wings 10' and 10" can overlap the inner mounting plate by a wing overlap portion 33' on one side and by a wing overlap portion 33" on the other side. Concurrently, the outer mounting plate 34 that is coupled with the inner mounting plate 31 to form a wing opening 38 for the wings 10 can slide over the wings 10 and overlap at least the wings by an outer mounting plate overlap portion 36' over one wing 10' and by an outer mounting plate overlap portion 36" on the other wing 10". The overlap portion 36 generally will be at least as wide as the overlap portion 33. Thus, the width of the overlap portion 36 divided by the width of the overlap portion 33 could be about 100% and preferably greater, such as 200%, 300%, and greater as well as any increment therebetween, inclusively. Thus, the mounting assembly can be coupled with the supporting system 4 in a sideways direction 17 and an outward direction 18. The mounting assembly 30 can be secured to the retainer 14 and thus be coupled also in a longitudinal direction 19, where the directions are relative to FIG. 5. The outer mounting plate 34 can have a width 35 (in a direction across the channel) that is at least the width 32 of the inner mounting plate 30, and preferably wider than the inner mounting plate width. In at least one embodiment, the outer mounting plate 34 can have a width 35 that overlaps at least the wings 10 across the channel 6 and advantageously a portion of the support system 4 adjacent each wing with outer mounting plate portions 36' and 36".

Figure 15:
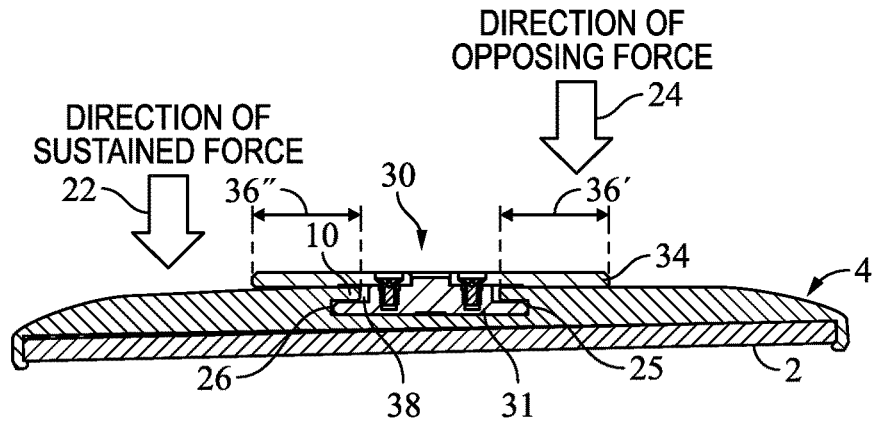
FIG. 15 is a schematic cross sectional view of a force being applied to the portable device with the support system of FIG. 14 that maintains the coupling to the reinforced load mounting assembly.

FIG. 15 is a schematic cross sectional view of a force being applied to the portable device with the support system of FIG. 14 that maintains the coupling to the reinforced load mounting assembly. When a force 22 is applied to a back of the support system 4 off center from the mounting assembly 30, at least one wing 10 will tend to bend. However, the wing 10 is restrained in the wing opening 38 with an opposing force 24 from the outer mounting plate 34 on at least a portion of the support assembly distal from the force 22 relative to the mounting assembly. Further, the wing opening 38 itself can assist in restraining the wing from bending, because of the space in the wing opening between the inner mounting plate 31 and the outer mounting plate 34 minus the thickness of the wing.

Figure 16:
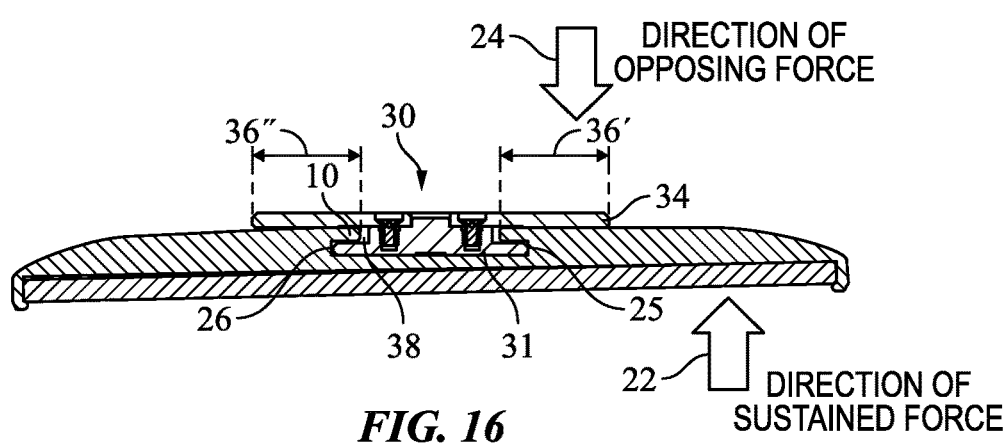
FIG. 16 is a schematic cross sectional view of another force from a different position being applied to the portable device with the support system of FIG. 14 that maintains the coupling to the reinforced load mounting assembly.

FIG. 16 is a schematic cross sectional view of another force from a different position being applied to the portable device with the support system of FIG. 14 that maintains the coupling to the reinforced load mounting assembly. In a similar manner as explained in FIG. 15, a force 22 can press against the portable device off center from the mounting assembly 30 that can be coupled on a different face of the support system 4, and at least one wing 10 could tend to bend. However, the wing 10 is restrained in the wing opening 38 with an opposing force 24. In this scenario of an applied force, the wing opening 38 itself can assist by restraining the wing bending to the distance between the inner mounting plate 31 and the outer mounting plate 34 in the wing opening minus the thickness of the wing.

Figure 18:
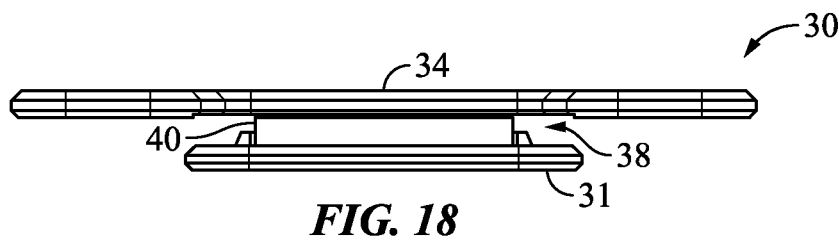
FIG. 18 is a schematic top view of the reinforced load mounting system of FIG. 17.
Figure 17:
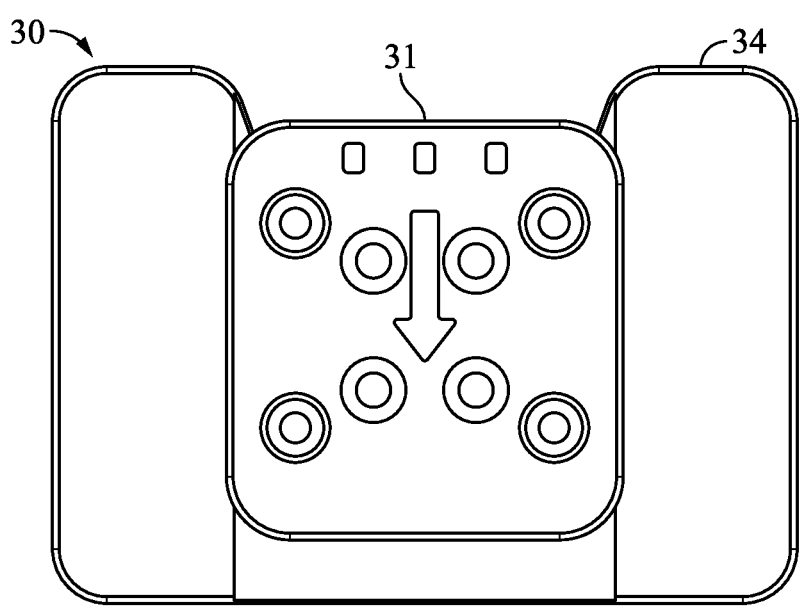
FIG. 17 is a schematic front view of the illustrative embodiment of the reinforced load mounting system of FIG. 9.
Figure 19:
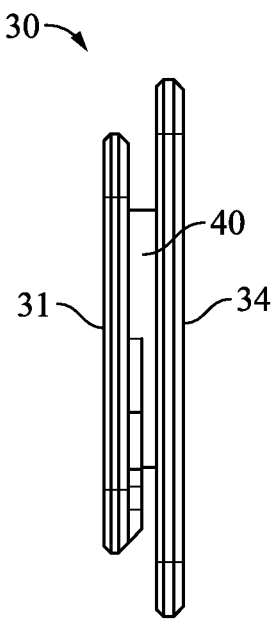
FIG. 19 is a schematic side view of the reinforced load mounting system of FIG. 17.
Figure 20:
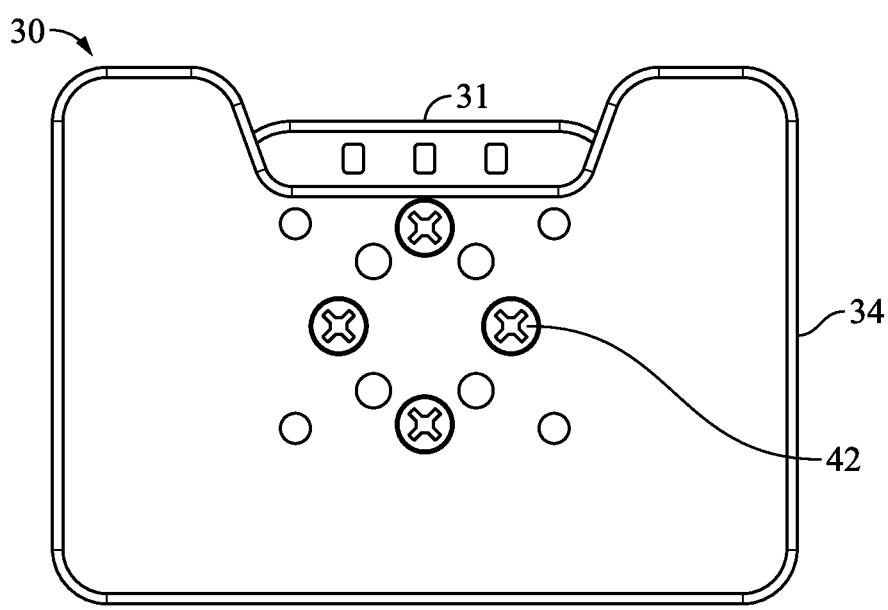
FIG. 20 is a schematic back view of the illustrative embodiment of the reinforced load mounting system of FIG. 17.

FIG. 17 is a schematic front view of the illustrative embodiment of the reinforced load mounting system of FIG. 9. FIG. 18 is a schematic top view of the reinforced load mounting system of FIG. 17. FIG. 19 is a schematic side view of the reinforced load mounting system of FIG. 17. FIG. 20 is a schematic back view of the illustrative embodiment of the reinforced load mounting system of FIG. 17. The reinforced load mounting assembly 30, as described above, includes the inner mounting plate 31 coupled with the outer mounting plate 34. To create the wing opening 38, a spacer 40 can be formed between the plates or formed integral to one or both of the plates. For manufacturing efficiency, the inner mounting plate 31 can be made separately and fastened with the outer mounting plate 34, such as with fasteners 42.

Figure 21:
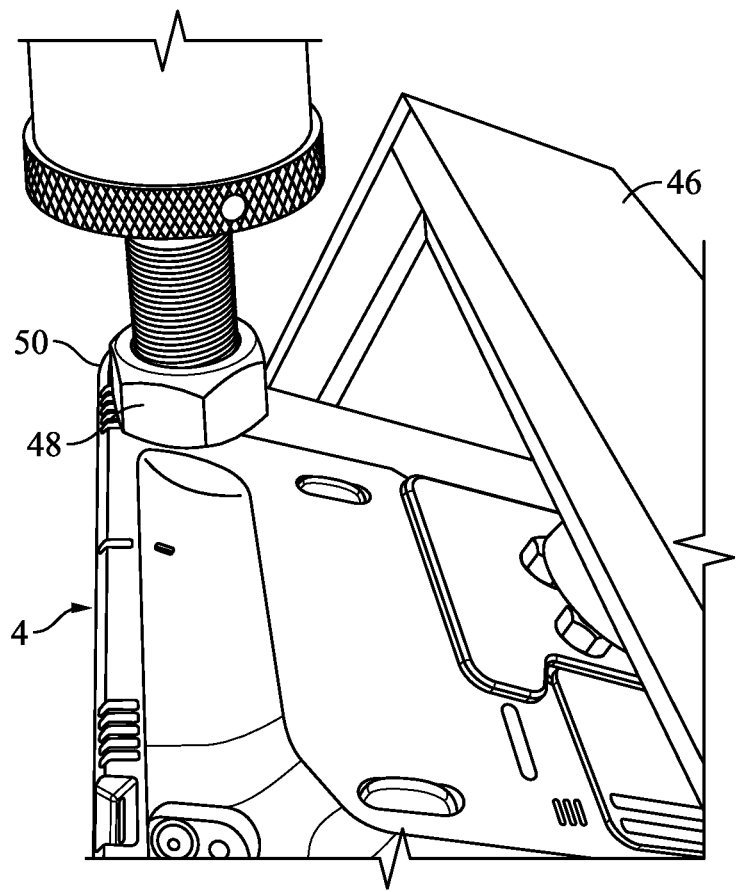
FIG. 21 is a schematic of a photo of an illustrative test fixture with a load device configured to apply a force to a corner of the support system coupled with the reinforced load mounting assembly.

FIG. 21 is a schematic of a photo of an illustrative test fixture with a load device configured to apply a force to a corner of the support system coupled with the reinforced load mounting assembly. The reinforced load mounting assembly 30 can be securely coupled to a test fixture 46. The support assembly for can be releasably coupled with the reinforced load mounting assembly as described above. A load device 48 can be positioned to apply a load to the support assembly 4 that is off center to the mounting assembly and create a high bending force on the support assembly and its connection with the mounting assembly 30.

Figure 22:
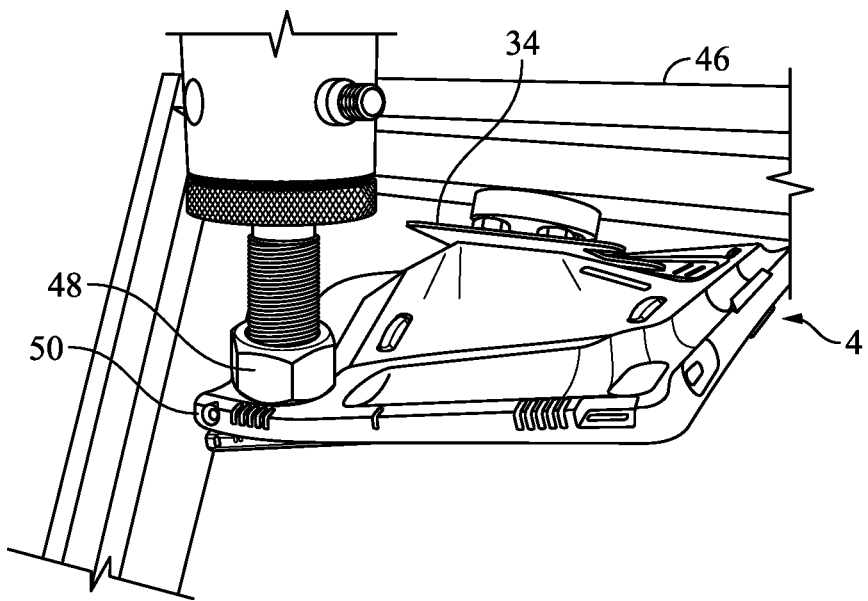
FIG. 22 is a schematic of a photo of the illustrative test fixture of FIG. 21 with the load device applying the force to the corner of the support system that is still coupled with the reinforced load mounting assembly.

FIG. 22 is a schematic of a photo of the illustrative test fixture of FIG. 21 with the load device applying the force to the corner of the support system that is still coupled with the reinforced load mounting assembly. After the load device 48 applies a load to the support assembly 4, the support assembly is severely twisted and deformed. However, the reinforced load mounting assembly 30 is able to maintain coupling with the support assembly and withstand the force.

Other and further embodiments utilizing one or more aspects of the invention described above can be devised without departing from the spirit of Applicant's invention. For example, combinations of shapes and sizes for the channel, wings, mounting assembly, and other structures can be chosen and various features added to enhance the operation the mounting system with the support system, along with other variations made within the scope of the claims.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalents of the following claims.

What is claimed is:

1. A reinforced load mounting system for a portable device having a detachable support system with a channel, the channel having a bottom and a first side and a second side with an opening between the sides, and further having overarching wings that extend at least partially across the channel opening from each side and over the bottom of the channel, the mounting assembly comprising:
    an inner mounting plate configured to slidably engage the support system in the channel between a bottom of the channel and the wings to detachably couple the support system and the mounting assembly, the wings being configured to restrain the inner mounting plate from detachment from the support system in an outward direction; and
    an outer mounting plate coupled to the inner mounting plate and having a width that is wider than a width between the wings across the channel and configured to restrain at least one of the wings from detachment from the inner mounting plate in an outward direction away from the support system caused by bending movement from a force applied at a distance from a center of the mounting assembly.

2. The system of claim 1, wherein the inner mounting plate and the outer mounting plate are coupled with a wing opening between portions of the inner mounting plate and the outer mounting plate and configured to allow the wings to be disposed in the wing opening when the support system is engaged with the mounting assembly.

3. The system of claim 1, wherein the outer mounting plate is at least as wide across the channel as the inner mounting plate.

4. The system of claim 1, wherein the outer mounting plate overlaps the wings with a portion that is at least equal to an overlap of the wings over the inner mounting plate.

5. The system of claim 1, wherein the support system is detachably coupled with the portable device.

6. The system of claim 1, wherein the support system is integrally coupled with the portable device.

7. A method of restraining a detachable support system coupled with a mounting assembly forming an reinforced load mounting system, the support system having a channel, the channel having a bottom and a first side and a second side with a channel opening between the sides, and further having overarching wings that extend at least partially across the channel opening from each side and over the bottom of the channel, the mounting assembly comprising:

sliding the support system channel along the mounting assembly;

enclosing an inner surface and an outer surface of the wings of the channel in a wing opening of the mounting assembly between an inner mounting plate coupled with an outer mounting plate of the mounting assembly to couple the support system with the mounting assembly; and restraining at least one of the wings from detachment from the mounting assembly in an outward direction away from the support system caused by bending movement from a force applied at a distance from a center of the mounting assembly.

8. The method of claim 7, wherein the support system is coupled with a portable device.

\* \* \* \* \*